(12) United States Patent
Sugiyama et al.

(10) Patent No.: US 10,434,978 B2
(45) Date of Patent: Oct. 8, 2019

(54) WEBBING TAKE-UP DEVICE

(71) Applicant: KABUSHIKI KAISHA TOKAI-RIKA-DENKI-SEISAKUSHO, Aichi (JP)

(72) Inventors: Motoki Sugiyama, Aichi (JP); Akira Sumiyashiki, Aichi (JP); Shinichi Okubo, Aichi (JP); Wataru Yanagawa, Aichi (JP); Yasunori Hata, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 107 days.

(21) Appl. No.: 15/567,836

(22) PCT Filed: Apr. 13, 2016

(86) PCT No.: PCT/JP2016/061924
§ 371 (c)(1),
(2) Date: Oct. 19, 2017

(87) PCT Pub. No.: WO2016/171056
PCT Pub. Date: Oct. 27, 2016

(65) Prior Publication Data
US 2018/0086304 A1  Mar. 29, 2018

(30) Foreign Application Priority Data
Apr. 24, 2015 (JP) .................. 2015-089186

(51) Int. Cl.
*B60R 22/28* (2006.01)
*B60R 22/34* (2006.01)

(52) U.S. Cl.
CPC ............. *B60R 22/28* (2013.01); *B60R 22/34* (2013.01); *B60R 2022/286* (2013.01)

(58) Field of Classification Search
CPC .... B60R 22/28; B60R 22/34; B60R 2022/286
See application file for complete search history.

(56) References Cited

U.S. PATENT DOCUMENTS

| | | | |
|---|---|---|---|
| 7,753,305 B2* | 7/2010 | Katayama | B60R 22/3413 242/379.1 |
| 8,439,291 B2* | 5/2013 | Ukita | B60R 22/3413 242/375 |

(Continued)

FOREIGN PATENT DOCUMENTS

| | | |
|---|---|---|
| DE | 102006034582 A1 | 2/2008 |
| JP | 2001-310705 A | 11/2001 |

(Continued)

OTHER PUBLICATIONS

International Search Report and Written Opinion issued in the corresponding application PCT/JP2016/061924 dated Jun. 14, 2016.

*Primary Examiner* — Sang K Kim
(74) *Attorney, Agent, or Firm* — Roberts Mlotkowski Safran Cole & Calderon, P.C.

(57) ABSTRACT

A webbing take-up device includes a spool that takes up a webbing worn by an occupant, and that is rotated in a pull-out direction due to the webbing being pulled out, and a lock base that limits pull-out direction rotation of the spool in a vehicle emergency. The webbing take-up device further includes an energy absorbing wire that undergoes deformation so as to permit pull-out direction rotation of the spool at or above a force limiter load when the lock base has limited pull-out direction rotation of the spool, and a second force limiter mechanism that adjusts the pressing force of the energy absorbing wire according to a remaining take-up amount of the webbing on the spool.

5 Claims, 11 Drawing Sheets

(56) References Cited

U.S. PATENT DOCUMENTS

| | | | |
|---|---|---|---|
| 2006/0214494 A1* | 9/2006 | Katayama | B60R 22/4676 297/475 |
| 2006/0219832 A1* | 10/2006 | Katayama | B60R 22/3413 242/379.1 |
| 2006/0279076 A1 | 12/2006 | Kielwein et al. | |
| 2015/0175123 A1* | 6/2015 | Yanagawa | B60R 22/341 242/379.1 |
| 2015/0175124 A1* | 6/2015 | Yanagawa | B60R 22/341 242/379.1 |

FOREIGN PATENT DOCUMENTS

| | | |
|---|---|---|
| JP | 2002-067879 A | 3/2002 |
| JP | 2010-089528 A | 4/2010 |
| JP | 2010-241211 A | 10/2010 |
| JP | 2011-183873 A | 9/2011 |

\* cited by examiner

WEBBING TAKE-UP DEVICE

CROSS-REFERENCE TO RELATED APPLICATIONS

The present application is a U.S. National Phase of PCT/JP2016/061924 filed on Apr. 13, 2016 claiming priority to Japanese Patent Application No. 2015-089186 filed Apr. 24, 2015. The disclosure of the PCT Application is hereby incorporated by reference into the present Application.

TECHNICAL FIELD

The present invention relates to a webbing take-up device that permits pull-out direction rotation of a spool at or above a force limiter load when a lock section has limited pull-out direction rotation of the spool.

BACKGROUND ART

In a webbing take-up device described in Japanese Patent Application Laid-Open (JP-A) No. 2001-310705, one end portion of a bobbin (spool) is fixed so as to be capable of rotating as a unit together with a locking base. In a vehicle emergency, a pawl provided to the locking base engages with a latch plate. When this occurs, a shear pin fixing the latch plate is snapped such that the latch plate rotates.

The above retractor is provided with a housing shaft, the housing shaft being disposed parallel to the bobbin (spool). A wire (energy absorption member) is coiled around the housing shaft, the wire extends out from the housing shaft toward a pulley of the latch plate, and one end of the wire is anchored to the pulley. Moreover, the wire extending out from the housing shaft toward the pulley is plastically deformed by an energy absorption section. When the latch plate is rotated, the wire is taken up onto the latch plate while being plastically deformed in the energy absorption section. This thereby absorbs shock energy.

Moreover, an energy absorption mechanism determines the body weight of an occupant and a rate of acceleration/deceleration based on output from a body weight sensor provided in a vehicle seat and a collision sensor provided to the vehicle, and calculates a webbing pull-out load arising in the occupant. A plastic deformation amount of the wire by the energy absorption section is then adjusted according to the pull-out load. Namely, the force limiter load is adjusted.

SUMMARY OF INVENTION

Technical Problem

However, to adjust the plastic deformation amount of the wire by the energy absorption section, the webbing take-up device described in JP-A No. 2001-310705 requires the body weight sensor and the collision sensor, as well as an ECU to calculate the webbing pull-out load arising in the occupant based on the outputs of the body weight sensor and the collision sensor, and the like. This results in an increase in the number of components configuring the webbing take-up device.

In consideration of the above circumstances, an object of the present invention is to obtain a webbing take-up device capable of adjusting a force limiter load while suppressing an increase in the number of components.

Solution to Problem

A webbing take-up device of a first aspect of the present invention includes a spool, a lock section, an energy absorption member, and a force limiter load adjustment mechanism. The spool takes up a webbing worn by an occupant, and is rotated in a pull-out direction due to the webbing being pulled out. The lock section limits pull-out direction rotation of the spool in a vehicle emergency. The energy absorption member, in a pressed state, permits pull-out direction rotation of the spool at or above a force limiter load when the lock section has limited pull-out direction rotation of the spool, and is configured such that increasing a pressing force increases the force limiter load. The force limiter load adjustment mechanism adjusts the pressing force of the energy absorption member according to a remaining take-up amount of the webbing on the spool.

A webbing take-up device of a second aspect of the present invention is the webbing take-up device of the first aspect, wherein the force limiter load adjustment mechanism is configured including a first pressing section and a second pressing section, the energy absorption member being disposed interposed between the first pressing section and the second pressing section. Further, at least one out of the first pressing section or the second pressing section is displaced to a position corresponding to the remaining take-up amount of the webbing on the spool, and the pressing force of the energy absorption member is adjusted by the first pressing section and the second pressing section approaching each other or moving away from each other.

A webbing take-up device of a third aspect of the present invention is the webbing take-up device of the second aspect, wherein the force limiter load adjustment mechanism is configured including a displacement member that is displaced by rotation transmitted from the spool. Further, at least one out of the first pressing section or the second pressing section is displaced due to the displacement member being displaced such that the displacement member presses at least one out of the first pressing section or the second pressing section.

Advantageous Effects of Invention

In the webbing take-up device of the first aspect of the present invention, the webbing worn by an occupant is taken up by the spool. The occupant wears the webbing by pulling the webbing out from the spool. Moreover, in a vehicle emergency, pull-out direction rotation of the spool is limited by the lock section. When the webbing is pulled in the pull-out direction and load acting on the spool is at or above a force limiter load in this state, pull-out direction rotation of the spool is permitted.

In the webbing take-up device of the present invention, the force limiter load switching mechanism adjusts the pressing force of the energy absorption member according to the remaining take-up amount of the webbing on the spool, namely, according to the physical build of the occupant wearing the webbing. This thereby enables the force limiter load to be adjusted without providing a body weight sensor or the like to detect the build of the occupant. Namely, the webbing take-up device of the present invention enables the force limiter load to be adjusted while suppressing an increase in the number of components.

In the webbing take-up device of the second aspect of the present invention, at least one out of the first pressing section or the second pressing section is displaced to a position corresponding to the remaining take-up amount of the webbing on the spool. The pressing force of the energy absorption member at a location disposed interposed between the first pressing section and the second pressing section is thereby adjusted by the first pressing section and the second pressing section approaching each other or moving away from each other. This enables the force limiter load to be adjusted.

In the webbing take-up device of the third aspect of the present invention, when rotation from the spool is transmitted to the displacement member, the displacement member presses at least one out of the first pressing section or the second pressing section. The force limiter load is thereby adjusted by the first pressing section and the second pressing section approaching each other or moving away from each other. Namely, in the present invention, the force limiter load can be adjusted without providing an electric actuator to move the first pressing section and the second pressing section toward each other or away from each other.

BRIEF DESCRIPTION OF DRAWINGS

FIG. 10 is a side view corresponding to FIG. 8, illustrating a wire guide provided with a restriction projection and the like.

DESCRIPTION OF EMBODIMENTS

Figure 1:
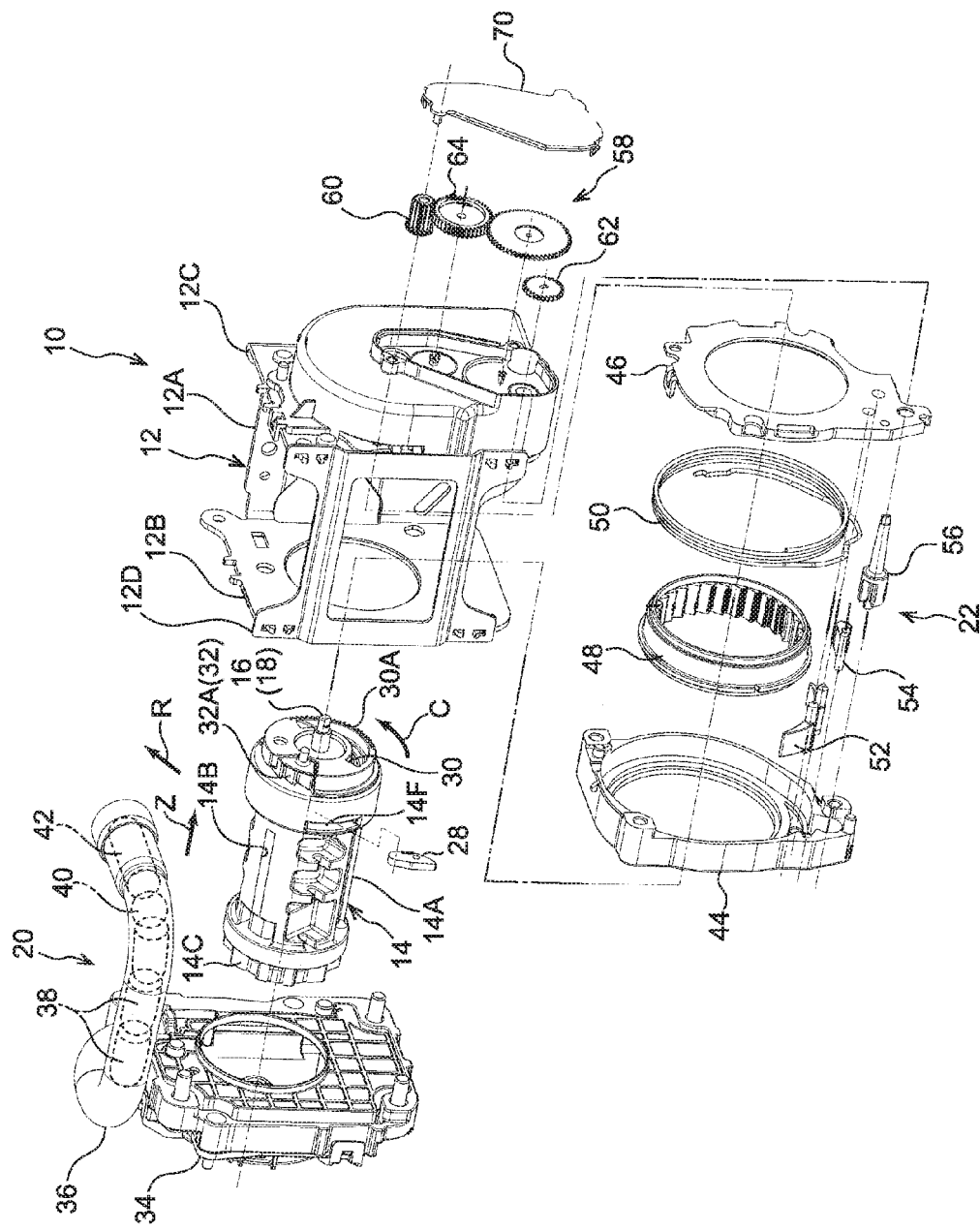
FIG. 1 is an exploded perspective view illustrating a webbing take-up device of an exemplary embodiment.

Explanation follows regarding a webbing take-up device according to an exemplary embodiment of the present invention, with reference to FIG. 1 to FIG. 9. Note that in the drawings, the arrow Z direction, the arrow R direction, and the arrow C direction respectively indicate an axial direction, radial direction, and circumferential direction of a spool, as appropriate. Moreover, in the following explanation, unless specifically stated otherwise, reference simply to the axial direction, radial direction, and circumferential direction refers to the axial direction, radial direction, and circumferential direction of the spool.

Figure 2:
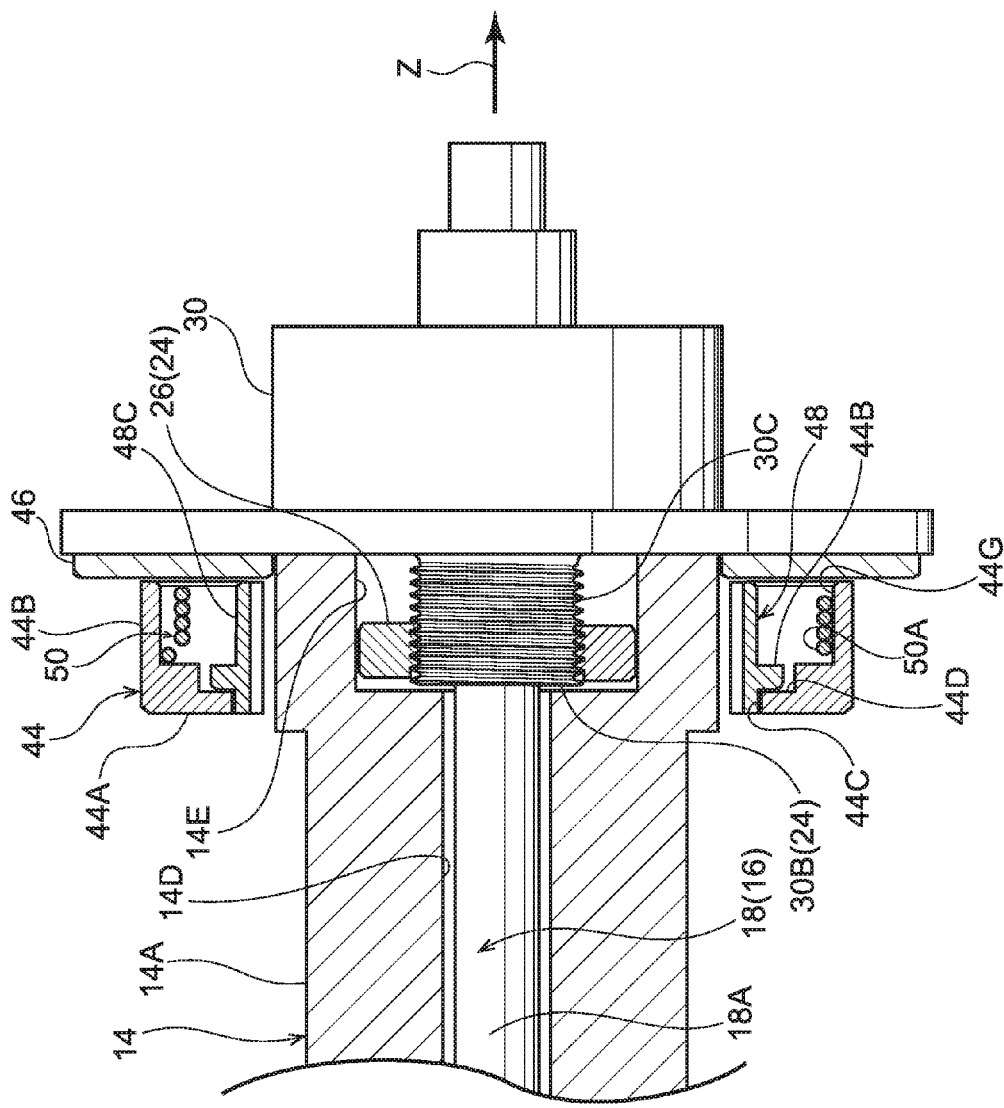
FIG. 2 is an enlarged cross-section taken along an axial direction of a spool.

As illustrated in FIG. 1, a webbing take-up device 10 according to an exemplary embodiment of the present invention includes a frame 12, a spool 14 that takes up a non-illustrated webbing, and a torsion shaft 18 configuring a first force limiter mechanism 16 (also see FIG. 2). The webbing take-up device 10 further includes a pre-tensioner mechanism 20 that forcibly rotates the spool 14 in a take-up direction in a vehicle emergency, and a second force limiter mechanism 22 provided with a force limiter load generation mechanism and a force limiter load adjustment mechanism.

The frame 12 is formed in a rectangular frame shape, and includes a plate shaped back plate 12A that is fixed to a vehicle body. Leg plates 12B, 12C extend out substantially perpendicularly from both width direction end portions of the back plate 12A, and end portions of the leg plates 12B, 12C on the opposite side to the back plate 12A are connected together by a connection plate 12D.

The spool 14 includes a take-up section 14A that is formed in a substantially circular column shape and on which the non-illustrated webbing is taken up. The take-up section 14A is formed with an insertion hole 14B through which the webbing is inserted. The insertion hole 14B is formed in a rectangular shape with its length direction in the axial direction as viewed from the radial direction outside. The webbing is inserted through the insertion hole 14B, and a length direction end portion of the webbing is anchored to the spool 14 by attachment of a stopper member to the length direction end portion of the webbing. Rotating the spool 14 toward another circumferential direction side (in the opposite direction to the arrow C direction) takes up the webbing onto the spool 14, and pulling out the webbing from the spool 14 rotates the spool 14 toward one circumferential direction side (the arrow C direction), namely rotates the spool 14 in a pull-out direction. Further, an end portion on another axial direction side (in the opposite direction to the arrow Z direction) of the spool 14 is provided with engaging teeth 14C with which moving members 38 of the pre-tensioner mechanism 20, described later, engage.

As illustrated in FIG. 2, an axial center portion of the spool 14 is formed with a torsion shaft insertion hole 14D into which the torsion shaft 18, described later, is inserted. A closed end side of the torsion shaft insertion hole 14D (another axial direction side) is formed with a non-illustrated first engaged portion with which the another axial direction side end portion of the torsion shaft 18 engages. The another axial direction side end portion of the torsion shaft 18 and the spool 14 are joined so as to be capable of rotating together as a unit through engagement of the another axial direction side end portion of the torsion shaft 18 with the first engaged portion.

The axial center portion of the spool 14 and one axial direction side end portion of the spool 14 are formed with a rotation-limiting nut housing hole 14E that houses a rotation-limiting nut 26 configuring part of a rotation-limiting mechanism 24. As viewed from one axial direction side, an inner edge of the rotation-limiting nut housing hole 14E is formed with a hexagonal profile corresponding to the shape of an outer edge of the rotation-limiting nut 26. The rotation-limiting nut 26 inserted into the rotation-limiting nut housing hole 14E is thereby capable of rotating as a unit together with the spool 14. The depth of the rotation-limiting nut housing hole 14E from one side to the other side in the axial direction of the spool 14 is set so as to be deeper than the thickness of the rotation-limiting nut 26. Accordingly, the rotation-limiting nut 26 is capable of moving along the axial direction within the rotation-limiting nut housing hole 14E.

As illustrated in FIG. 1, the one axial direction side end portion of the spool 14 is formed with a housing hole 14F. The housing hole 14F houses an non-illustrated urging member, and an engaging tab 28 that engages with a winder section 48, described later. The engaging tab 28 is supported by the spool 14 so as to be capable of tilting in a state disposed inside the housing hole 14F, and the engaging tab 28 is urged by the urging member in a direction that would cause it to stick out from the housing hole 14F. In an assembled state of the webbing take-up device 10, the entire engaging tab 28 is in a state housed inside the housing hole 14F, and tilting of the engaging tab 28 is restricted by a non-illustrated tilt restricting member. When the spool 14 begins to rotate with respect to a lock base 30, described later, the tilting restriction of the engaging tab 28 by the tilt restricting member is released and the engaging tab 28 sticks out from the housing hole 14F. When the engaging tab 28 sticks out from the housing hole 14F, the engaging tab 28 engages with the winder section 48, thereby enabling the spool 14 and the winder section 48 to rotate together as a unit.

The one axial direction side of the spool 14 is provided with the lock base 30 and a lock gear 32, serving as a lock section configuring part of a lock mechanism. The lock base 30 is formed in a substantially circular plate shape with its thickness direction in the axial direction, and the lock base 30 is formed with first engaged teeth 30A that engage with non-illustrated ratchet teeth provided to the leg plate 12C of the frame 12. The lock gear 32 is attached to the lock base 30 so as to be capable of tilting, and the lock gear 32 is formed with second engaged teeth 32A that engage with the ratchet teeth mentioned above. In a vehicle emergency, rotation of the lock base 30 is restricted by engagement of the first engaged teeth 30A of the lock base 30 and the second engaged teeth 32A of the lock gear 32 with the non-illustrated ratchet teeth provided to the leg plate 12C of the frame 12.

As illustrated in FIG. 2, another axial direction side of the lock base 30 is provided with a cylindrical portion 30B that is integrally formed to the lock base 30 and that configures another part of the rotation-limiting mechanism 24. The cylindrical portion 30B is formed in a substantially circular cylinder shape, and an outer peripheral portion of the cylindrical portion 30B is formed with a male-threaded portion 30C that screws together with the rotation-limiting nut 26.

An axial center portion of the lock base 30 is formed with a non-illustrated second engaged portion with which one axial direction end portion of the torsion shaft 18, described later, engages. The one axial direction side end portion of the torsion shaft 18 and the lock base 30 are joined together so as to be capable of rotating together as a unit through engagement of the one axial direction side end portion of the torsion shaft and the second engaged portion.

The torsion shaft 18 is formed so as to be substantially rod shaped, and end portions on one side and the another side of the torsion shaft 18 in the axial direction are respectively provided with a second engaging portion and a first engaging portion, not illustrated, that respectively engage with the second engaged portion provided to the lock base 30 and the first engaged portion provided to the spool 14. A location of the torsion shaft 18 between the second engaging portion and the first engaging portion has a smaller diameter than the second engaging portion and the first engaging portion, and configures a torsion section 18A that has a substantially uniform circular cross-section along the axial direction. In a state in which pull-out direction rotation of the spool 14 with respect to the lock base 30 is limited through the torsion shaft 18, when a load acting on an occupant from the webbing exceeds a predetermined value, the torsion section 18A of the torsion shaft 18 twists, thereby permitting pull-out direction rotation of the spool 14 with respect to the lock base 30.

As illustrated in FIG. 1, the pre-tensioner mechanism 20 is configured including a cylinder 36 connected to a case 34, plural moving members 38 disposed inside the cylinder 36, a piston ball 40 that pushes the moving members 38, and a gas generator 42 that is attached to one end portion of the cylinder 36. The cylinder 36 is formed by bending a steel pipe material into a predetermined shape. The plural moving members 38, each formed in a substantially circular column shape, are inserted into the cylinder 36. The spherically formed piston ball 40 is inserted into the cylinder 36, at the moving member 38 side of the gas generator 42. The piston ball 40 pushes the moving members 38 as a result of an increase in pressure inside the cylinder 36 caused by high pressure gas generated by actuation of the gas generator 42. Accordingly, the plural moving members 38 move inside the cylinder 36 before engaging with the engaging teeth 14C provided to the spool 14, and pushing the engaging teeth 14C. The spool 14 is thereby rotated in the take-up direction.

Figure 3:
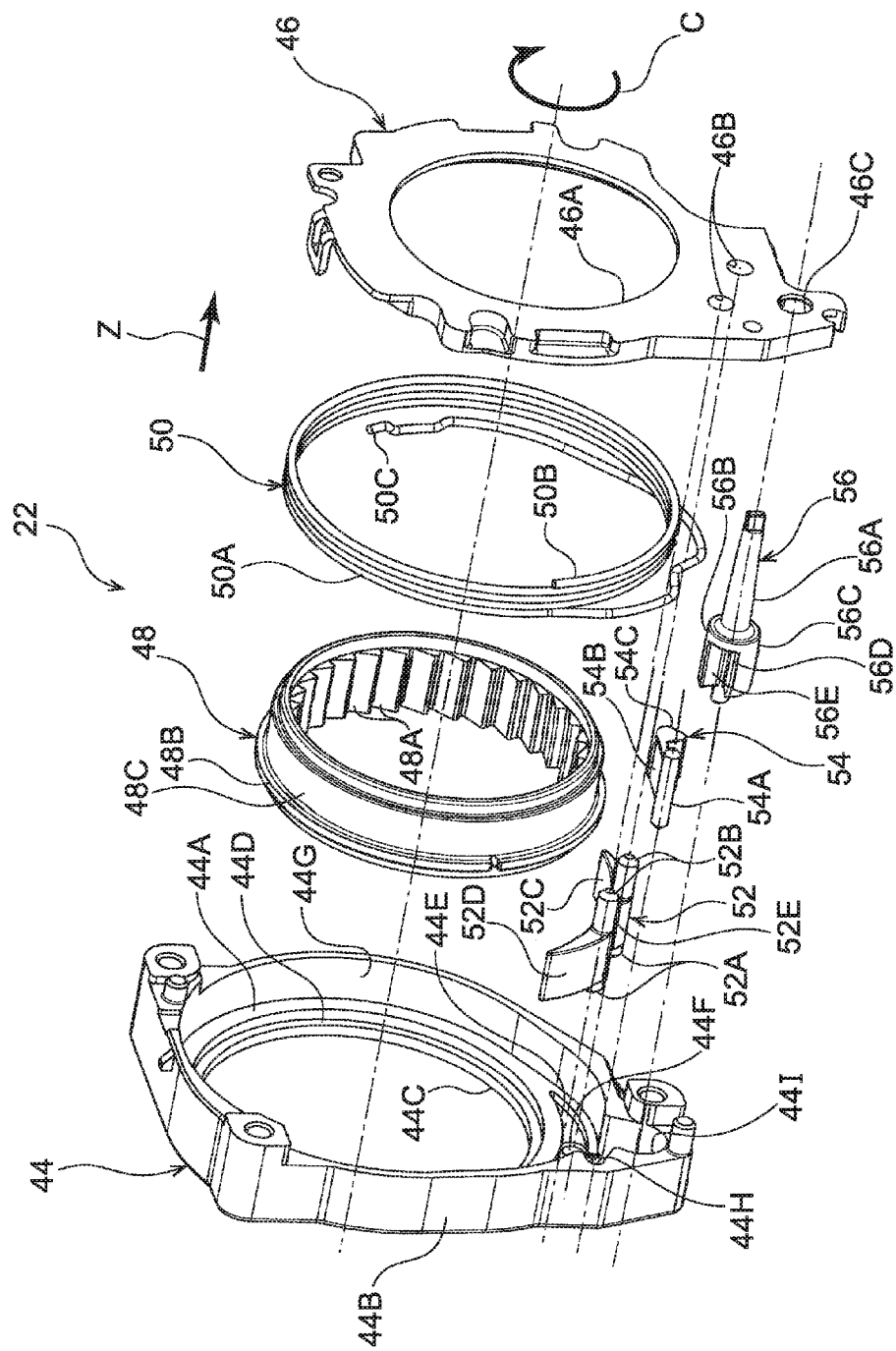
FIG. 3 is an exploded perspective view illustrating force limiter load generation and adjustment mechanisms in a webbing take-up device.

As illustrated in FIG. 3, the second force limiter mechanism 22 includes a housing 44 that is fixed to the leg plate 12C of the frame 12 (see FIG. 1A) and serves as a preset portion, and a cover sheet 46 that is attached to one axial direction side end portion of the housing 44. The second force limiter mechanism 22 includes the winder section 48 disposed between the housing 44 and the cover sheet 46, an energy absorbing wire 50 serving as an energy absorption member, a wire guide 52 serving as a pressing section (first pressing section), a lever 54 serving as a pressing section (second pressing section), and a cam 56 serving as a displacement member.

The housing 44 is formed in a box shape and is open toward the one axial direction side. The housing 44 includes a bottom wall 44A extending so as to face the leg plate 12C of the frame 12 (see FIG. 1), and a side wall 44B bent from an outer peripheral portion of the bottom wall 44A so as to extend toward the one axial direction side. The bottom wall 44A is formed with an insertion hole 44C, through which the one axial direction side end portion of the spool 14 (see FIG. 1) is inserted. The winder section 48, described later, is rotatably supported by engaging with a step portion 44D formed at an inner peripheral edge portion of the insertion hole 44C. A wire guide attachment portion 44E is provided at a radial direction outside of the location of the bottom wall 44A formed with the insertion hole 44C, and the wire guide 52, described later, is attached to the wire guide attachment portion 44E. The wire guide attachment portion 44E is formed with circular support holes 44F. A radial direction inside face of the side wall 44B is disposed facing the winder section 48, described later, along the radial direction. A portion of the radial direction inside face of the side wall 44B configures a preset face 44G formed with a circular tube face profile. A location of the side wall 44B corresponding to the wire guide attachment portion 44E of the bottom wall 44A is formed with a recessed lever support portion 44H that tiltably supports the lever 54, described later. Moreover, a location of the side wall 44B corresponding to the wire guide attachment portion 44E of the bottom wall 44A and a location adjacent to the recessed lever support portion 44H is formed with a recessed cam placement portion 44I in which the cam 56, described later, is disposed. Note that a location of the bottom wall 44A corresponding to the cam placement portion 44I is formed with a non-illustrated shaft support hole that supports another axial direction side end portion of the cam 56, described later.

The cover sheet 46 is attached to one axial direction side end portion of the side wall 44B of the housing 44. The cover sheet 46 is formed with an insertion hole 46A corresponding to the insertion hole 44C formed in the bottom wall 44A of the housing 44. Moreover, a location of the cover sheet 46 facing the wire guide attachment portion 44E of the housing 44 along the axial direction is formed with circular support holes 46B. A location of the cover sheet 46 aligned with the cam placement portion 44I of the housing 44 is formed with an insertion hole 46C through which a shaft 56A of the cam 56, described later, is inserted.

As illustrated in FIG. 2 and FIG. 3, the winder section 48 is formed in a tube shape. The winder section 48 is disposed coaxially to the spool 14 and at a radial direction outside of the one axial direction side end portion of the spool 14. An inner peripheral portion of the winder section 48 is formed along the circumferential direction with plural engaging teeth 48A with which the engaging tab 28 described above engages. Moreover, another axial direction side end portion of an outer peripheral portion of the winder section 48 is formed with a flange 48B projecting out toward the radial direction outside. A location of an outer peripheral face of the winder section 48 further toward the one axial direction side than the flange 48B configures a take-up face 48C on which the energy absorbing wire 50, described later, is taken up.

Figure 4:
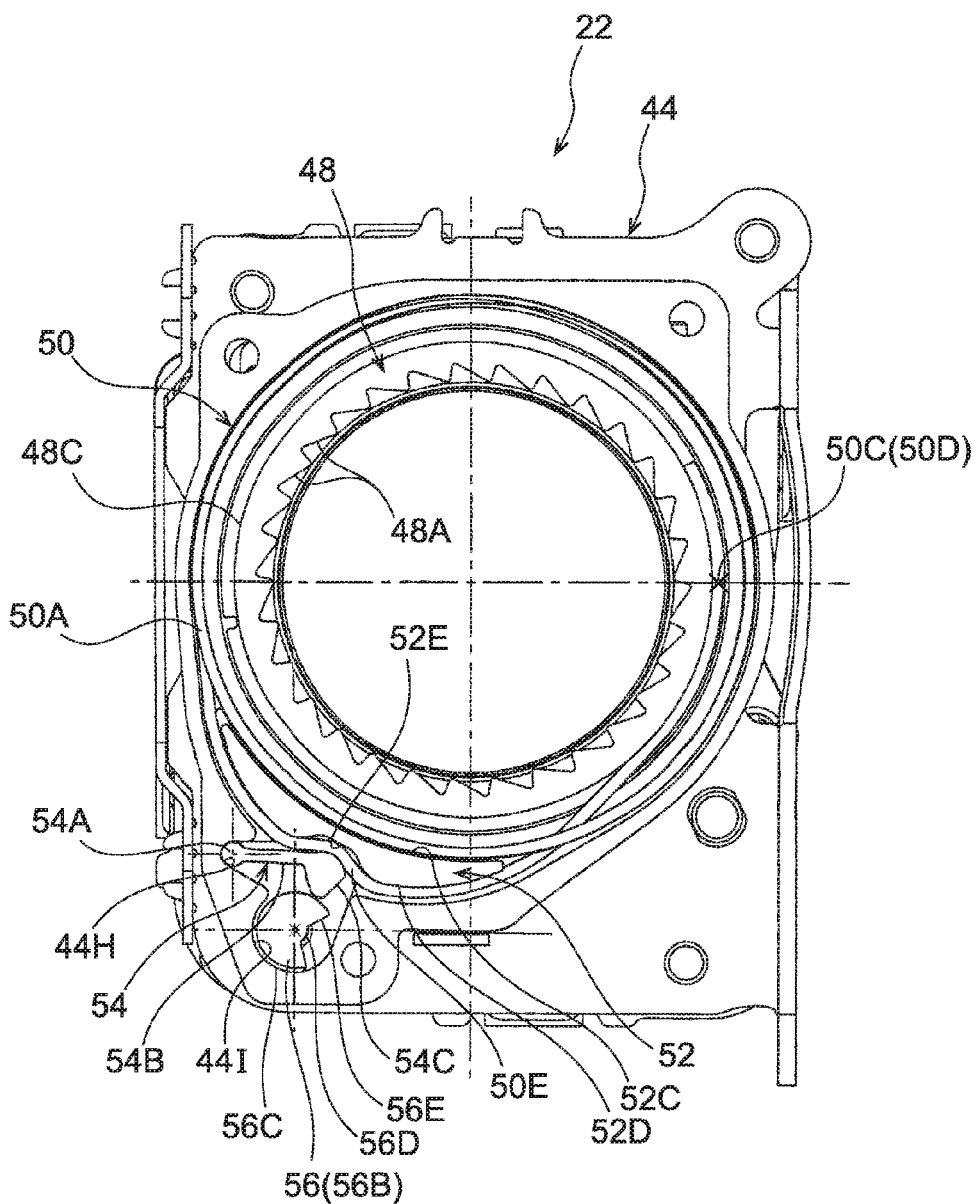
FIG. 4 is a face-on view illustrating force limiter load generation and adjustment mechanisms.
Figure 8:
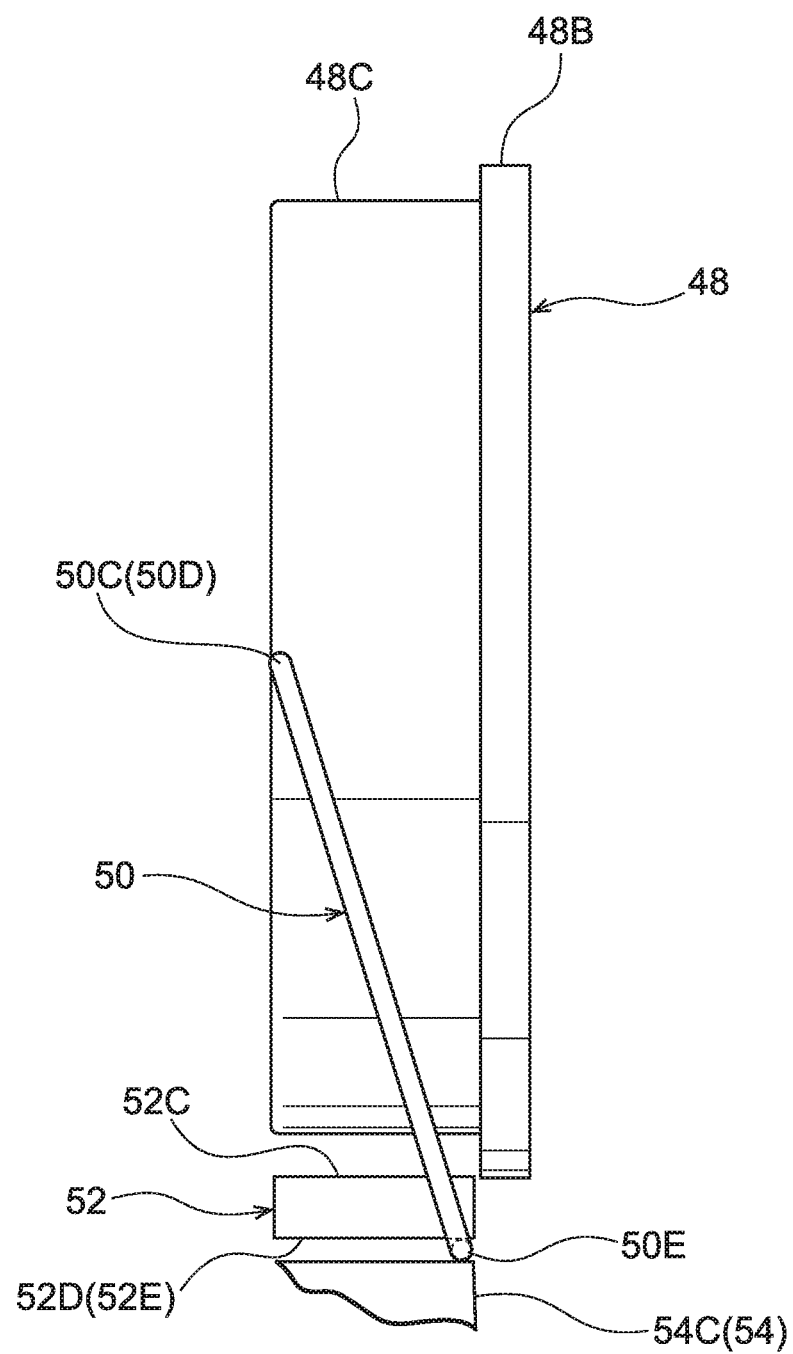
FIG. 8 is a side view schematically illustrating a state prior to an energy absorbing wire being taken up on a winder section.

The energy absorbing wire 50 is formed by coiling a linear member (wire shaped member) formed using a steel material or the like. Specifically, the energy absorbing wire 50 includes a ring shaped portion 50A formed by coiling the linear member in a circumferential direction so as to form a ring shape running along the axial direction. The external diameter of the ring shaped portion 50A in a natural state prior to being set against the preset face 44G of the housing 44 described above is configured so as to be a larger external diameter than the internal diameter of the preset face 44G. In a reduced-diameter state of the ring shaped portion 50A, the ring shaped portion 50A is disposed at the radial direction inside of the preset face 44G, and a radial direction outside face of the ring shaped portion 50A abuts a radial direction inside face of the preset face 44G, thereby attaching the energy absorbing wire 50 to the housing 44. One axial direction side end portion 50B of the energy absorbing wire 50 configures part of the ring shaped portion 50A. As illustrated in FIG. 4, another axial direction side end portion 50C of the energy absorbing wire 50 is displaced toward the one axial direction side of the ring shaped portion 50A through the radial direction inside of the ring shaped portion 50A. The another axial direction side end portion 50C of the energy absorbing wire 50 is anchored to one axial direction side end portion of the winder section 48. Accordingly, as illustrated in FIG. 8, a location 50D where the energy absorbing wire 50 is anchored to the winder section 48, and a location 50E pinched between the wire guide 52 and the lever 54, described later, are disposed offset with respect to each other in the axial direction of the winder section 48.

As illustrated in FIG. 3 and FIG. 4, the wire guide 52 is formed employing a material having a lower strength than the energy absorbing wire 50. The wire guide 52 is formed in a crescent shape with a radial direction outside face and radial direction inside face that curve gently as viewed along the axial direction. The wire guide 52 is formed in a block shape and has a predetermined thickness in the axial direction. Moreover, another axial direction side and one axial direction side of the wire guide 52 are respectively provided with circular column shaped support columns 52A, 52B that are inserted into the support holes 44F formed in the housing 44 and the support holes 46B formed in the cover sheet 46. A radial direction inside face of the wire guide 52 is configured by a setting face 52C that is abutted by the ring shaped portion 50A of the energy absorbing wire 50 attached to the housing 44. The setting face 52C is disposed so as to form an extension of the preset face 44G in a state in which the wire guide 52 is attached to the wire guide attachment portion 44E of the housing 44. Note that the curvature of the setting face 52C and the curvature of the preset face 44G are set so as to be substantially the same curvature as each other. Moreover, a radial direction outside face of the wire guide 52 configures a guide face 52D that guides a location on the energy absorbing wire 50 between the another axial direction side end portion 50C and a location displaced away from the ring shaped portion 50A. Moreover, a circumferential direction intermediate portion of the guide face 52D is formed with a depression 52E. The guide face 52D is thus formed with plural curved portions.

The lever 54 is formed in a block shape and includes a shaft 54A disposed in the lever support portion 44H formed in the housing 44, an arm 54B extending from the shaft 54A toward the wire guide 52 side, and a moving portion 54C provided at a leading end of the arm 54B. Specifically, the shaft 54A is formed in a circular column shape corresponding to the shape of an inner peripheral face of the lever support portion 44H. The shaft 54A is disposed in the lever support portion 44H such that the arm 54B tilts. Tilting of the arm 54B moves the moving portion 54C provided at the leading end of the arm 54B in a direction toward or away from the wire guide 52. The moving portion 54C is disposed facing the depression 52E formed in the guide face 52D of the wire guide 52. Moving the moving portion 54C toward the wire guide 52 side pinches the energy absorbing wire 50 between the moving portion 54C and the wire guide 52, and deforms the energy absorbing wire 50 into a shape conforming to the guide face 52D of the wire guide 52.

The cam 56 includes a shaft 56A formed in a substantially circular column shape, and a cam body 56B that is provided at another axial direction side of the shaft 56A and that rotates so as to push the moving portion 54C of the lever 54. As illustrated in FIG. 4, the cam body 56B is formed in a partially notched circular column shape, such that an outer peripheral portion of the cam body 56B is provided with a large diameter portion 56C, a small diameter portion 56D set with a smaller radius of curvature than the large diameter portion, and a connection portion 56E connecting the large diameter portion 56C and the small diameter portion 56D together. In a state in which the large diameter portion 56C of the cam body 56B and the moving portion 54C of the lever 54 abut each other, the moving portion 54C of the lever 54 is disposed in the vicinity of the guide face 52D of the wire guide 52. In a state in which the small diameter portion 56D of the cam body 56B and the moving portion 54C of the lever 54 abut each other, the moving portion 54C of the lever 54 is disposed away from the guide face 52D of the wire guide 52.

Figure 5:
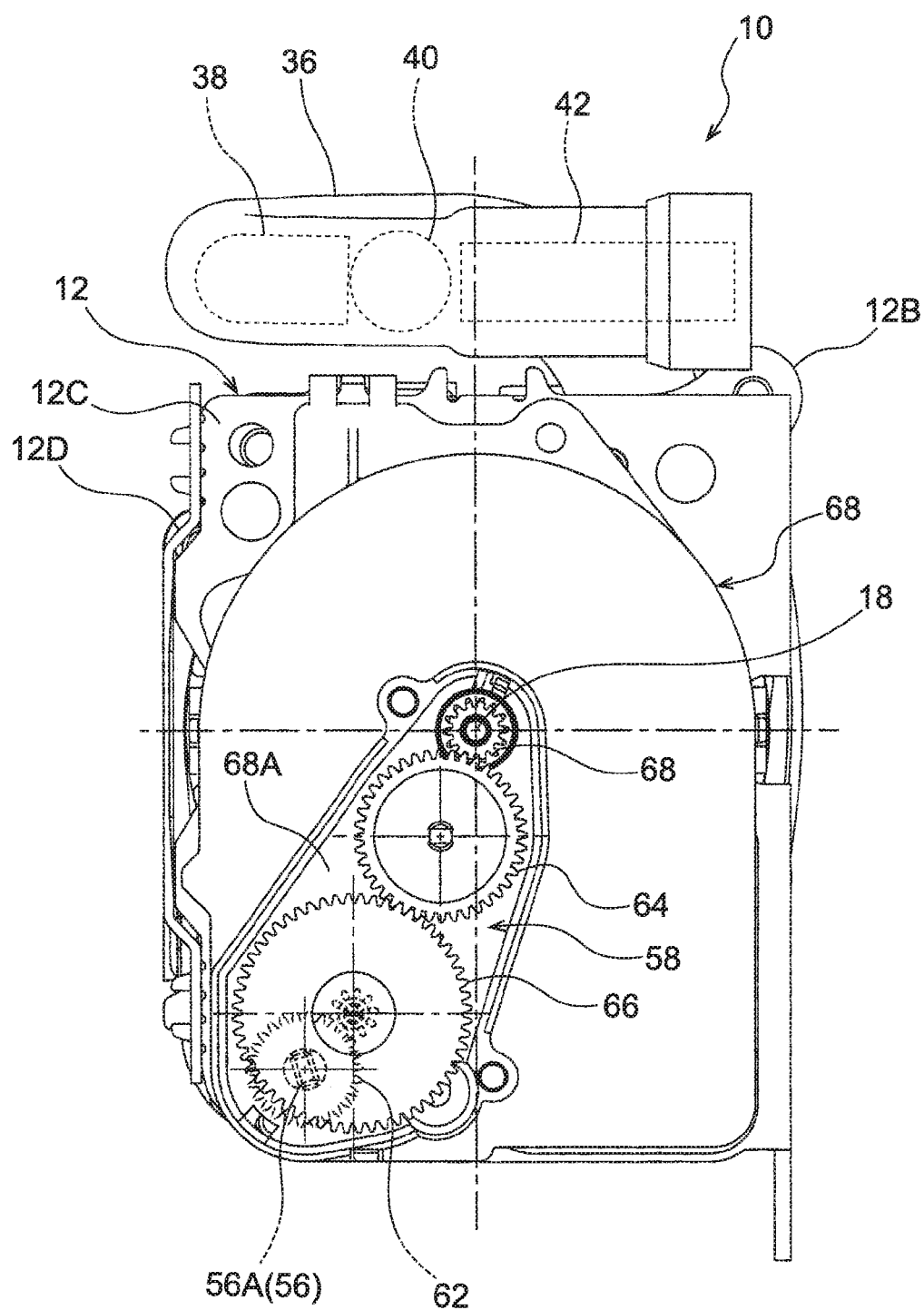
FIG. 5 is a face-on view illustrating a cam swinging mechanism.

As illustrated in FIG. 5, the cam 56 is rotated at a reduced speed via a cam turning mechanism 58. Specifically, the cam turning mechanism 58 is configured including a primary gear 60 that is attached to the one axial direction side end portion of the torsion shaft 18 so as to be capable of rotating as a unit together with the spool 14, a final gear 62 attached to one axial direction side end portion of the cam 56, and a first intermediate gear 64 and a second intermediate gear 66 that transmit rotation of the primary gear 60 to the final gear 62. When a predetermined length of the webbing has been pulled out from a fully taken-up state on the spool 14, the small diameter portion 56D of the cam body 56B and the moving portion 54C of the lever 54 abut each other. Accordingly, the moving portion 54C of the lever 54 is disposed away from the guide face 52D of the wire guide 52. When more than the predetermined length of the webbing is pulled out from the spool 14, the connection portion 56E of the cam body 56B and the moving portion 54C of the lever 54 abut each other, after which the large diameter portion 56C of the cam body 56B and the moving portion 54C of the lever 54 abut each other. The moving portion 54C of the lever 54 is thereby disposed in the vicinity of the guide face 52D of the wire guide 52. Note that in the present exemplary embodiment, setting is made such that when the webbing is being worn by an occupant of small build, the webbing pulled out from the spool 14 does not exceed the predetermined length, and when the webbing is being worn by an occupant of large build, the webbing pulled out from the spool 14 does exceed the predetermined length. Note that an occupant of small build is an occupant having the same physical build as an AF05 dummy, and an occupant of large build is an occupant having the same physical build as an AM50 dummy. Further, in the present exemplary embodiment, the primary gear 60, the final gear 62, the first intermediate gear 64, and the second intermediate gear 66 configuring the cam turning mechanism 58 are disposed inside a gear housing recess 68A formed in a gear case 68 attached to the leg plate 12C of the frame 12. The gear housing recess 68A is closed off by a gear cover 70.

Operation and Advantageous Effects of the Present Exemplary Embodiment

Next, explanation follows regarding operation and advantageous effects of the present exemplary embodiment.

As illustrated in FIG. 1, in the present exemplary embodiment, the non-illustrated webbing is worn over the body of an occupant of the vehicle by pulling the webbing out from the spool 14.

Moreover, in a state in which the webbing is being worn over the body of the occupant of the vehicle, a vehicle collision causes the lock mechanism to actuate, thereby preventing pull-out direction rotation of the lock base 30. As a result, pull-out direction rotation of the spool 14 coupled to the lock base 30 through the torsion shaft 18 is limited, thereby limiting pull-out of the webbing from the spool 14. The body of the occupant attempting to move toward the vehicle front is thereby restrained by the webbing.

Moreover, when the gas generator 42 is actuated in a vehicle collision, the piston ball 40 moves the plural moving members 38. The moving members 38 that have been moved engage with the engaging teeth 14C provided to the spool 14 and push the engaging teeth 14C, thereby rotating the spool 14 in the take-up direction. A predetermined length of the webbing is thereby taken up on the spool 14, thus eliminating any slack in the webbing worn by the occupant and increasing the restraint force on the occupant from the webbing.

Moreover, in a state in which pull-out direction rotation of the lock base 30 is restricted, should the body of the occupant pull on the webbing with an even greater force, such that a rotational force in the pull-out direction acting on the spool 14 as a result of this pulling force exceeds a torsion-withstand load (deformation-withstand load) of the torsion section 18A of the torsion shaft 18 (see FIG. 2), the torsion section 18A twists (deforms). Namely, the first force limiter mechanism 16 is actuated. Pull-out direction rotation of the spool 14 is thereby permitted at or above the force limiter load (torsion-withstand load of the torsion section 18A). Accordingly, pull-out direction rotation of the spool 14 is permitted as a result of the torsion section 18A twisting, thereby permitting pull-out of the webbing from the spool 14 and thus reducing a load (burden) acting on the chest of the occupant from the webbing. Moreover, kinetic energy of the occupant pulling on the webbing is absorbed in an amount commensurate with the twisting of the torsion section 18A.

Moreover, in the present exemplary embodiment, when the spool 14 begins to rotate together with the rotation-limiting nut 26 (see FIG. 2) in the pull-out direction with respect to the lock base 30, the rotation-limiting nut 26 moves along the cylindrical portion 30B toward the one axial direction side. Moreover, when the spool 14 and the rotation-limiting nut 26 have completed a predetermined number of revolutions with respect to the lock base 30, an end face on the one axial direction side of the rotation-limiting nut 26 abuts the lock base 30. The number of revolutions of the spool 14 with respect to the lock base 30 is thereby limited to a predetermined number of revolutions.

Figure 6:
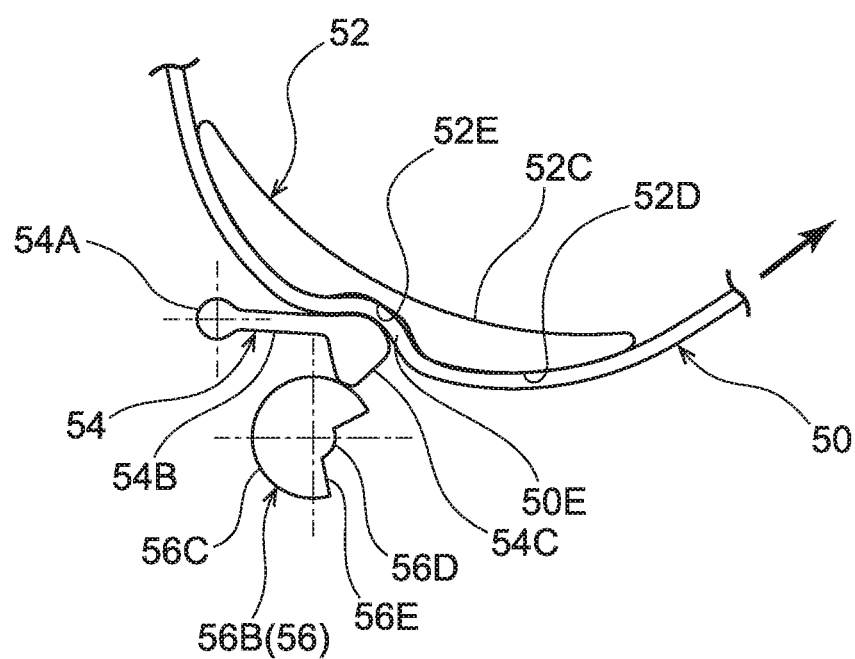
FIG. 6 is an enlarged face-on view illustrating a cam, a lever, and the like when webbing is being worn by an occupant of large build.

Note that as illustrated in FIG. 4 and FIG. 6, in a state in which the webbing is being worn by an occupant of large build and consequently the large diameter portion 56C of the cam body 56B and the moving portion 54C of the lever 54 are abutting each other, the moving portion 54C of the lever 54 is disposed in the vicinity of the guide face 52D of the wire guide 52. Accordingly, the energy absorbing wire 50 is pinched between the moving portion 54C and the wire guide 52, and is deformed in a substantially wavy line shape conforming to the guide face 52D of the wire guide 52.

Moreover, when the spool 14 begins to rotate in the pull-out direction with respect to the lock base 30, namely, when the torsion shaft 18 begins to twist, the engaging tab 28 illustrated in FIG. 1 sticks out from the housing hole 14F of the spool 14 and engages with the engaging teeth 48A of the winder section 48. The spool 14 and the winder section 48 accordingly rotate together as a unit. Moreover, when the winder section 48 rotates, the energy absorbing wire 50 is pulled through between the moving portion 54C and the wire guide 52 and taken up onto the winder section 48 while being deformed between the moving portion 54C and the wire guide 52 (being drawn through three drawing portions T). Accordingly, pull-out direction rotation of the spool 14 is permitted at or above the force limiter load (the sum of the torsion-withstand load of the torsion section 18A of the torsion shaft 18 and the drawing load of the energy absorbing wire 50).

Accordingly, the load (burden) acting on the chest of the occupant from the webbing is reduced by the torsion section 18A of the torsion shaft 18 undergoing torsion and by the energy absorbing wire 50 being pulled out between the moving portion 54C and the wire guide 52 while being deformed, and kinetic energy of the occupant pulling on the webbing is absorbed in an amount commensurate with the twisting deformation of the torsion section 18A of the torsion shaft 18 and the deformation of the energy absorbing wire 50.

Figure 7:
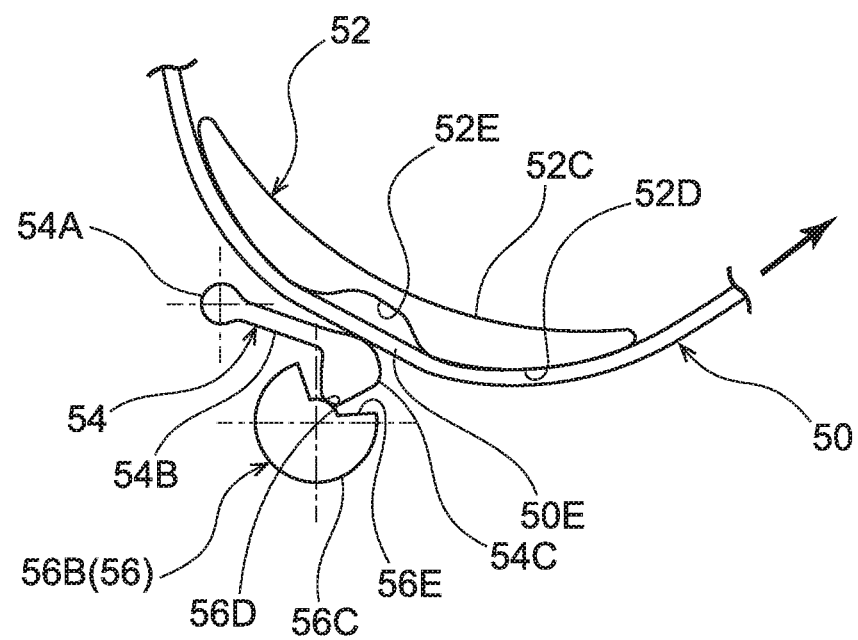
FIG. 7 is an enlarged face-on view illustrating a cam, a lever, and the like when webbing is being worn by an occupant of small build.

On the other hand, as illustrated in FIG. 7, in a state in which the webbing is being worn by an occupant of small build and consequently the small diameter portion 56D of the cam body 56B and the moving portion 54C of the lever 54 are abutting each other, the moving portion 54C of the lever 54 is disposed away from the guide face 52D of the wire guide 52. Accordingly, a state is attained in which the energy absorbing wire 50 is not deformed, or undergoes very little deformation, between the moving portion 54C and the wire guide 52. When the spool 14 rotates in the pull-out direction together with the winder section 48, the energy absorbing wire 50 is accordingly taken up onto the winder section 48 without being deformed (or undergoing very little deformation) between the moving portion 54C and the wire guide 52. Accordingly, pull-out direction rotation of the spool 14 is permitted at or above the force limiter load (the torsion-withstand load of the torsion section 18A of the torsion shaft 18).

As described above, in the present exemplary embodiment, in cases in which the webbing is being worn by an occupant of large build, a load value of the force limiter load is configured by a high load value. On the other hand, in cases in which the webbing is being worn by an occupant of small build, the load value of the force limiter load is configured by a low load value. This thereby enables appropriate protection according to the build of the occupant.

Note that in the second force limiter mechanism 22 of the present exemplary embodiment, a deformation amount of the energy absorbing wire 50 (pressing force acting on the energy absorbing wire 50) is adjusted according to a remaining take-up amount of the webbing on the spool 14, namely, according to the build of the occupant wearing the webbing. This thereby enables the force limiter load to be adjusted without providing a body weight sensor or the like to detect the build of the occupant. Namely, the webbing take-up device 10 of the present exemplary embodiment enables the force limiter load to be adjusted while suppressing an increase in the number of configuration components.

Moreover, in the second force limiter mechanism 22 of the present exemplary embodiment, the rotation of the spool 14 is transmitted to the cam 56 to rotate the cam 56, thereby adjusting the deformation amount of the energy absorbing wire 50. This thereby enables the force limiter load generated by the second force limiter mechanism 22 to be adjusted without providing an electric actuator to move the moving portion 54C of the lever 54 and the guide face 52D of the wire guide 52 together or away from each other.

Figure 9:
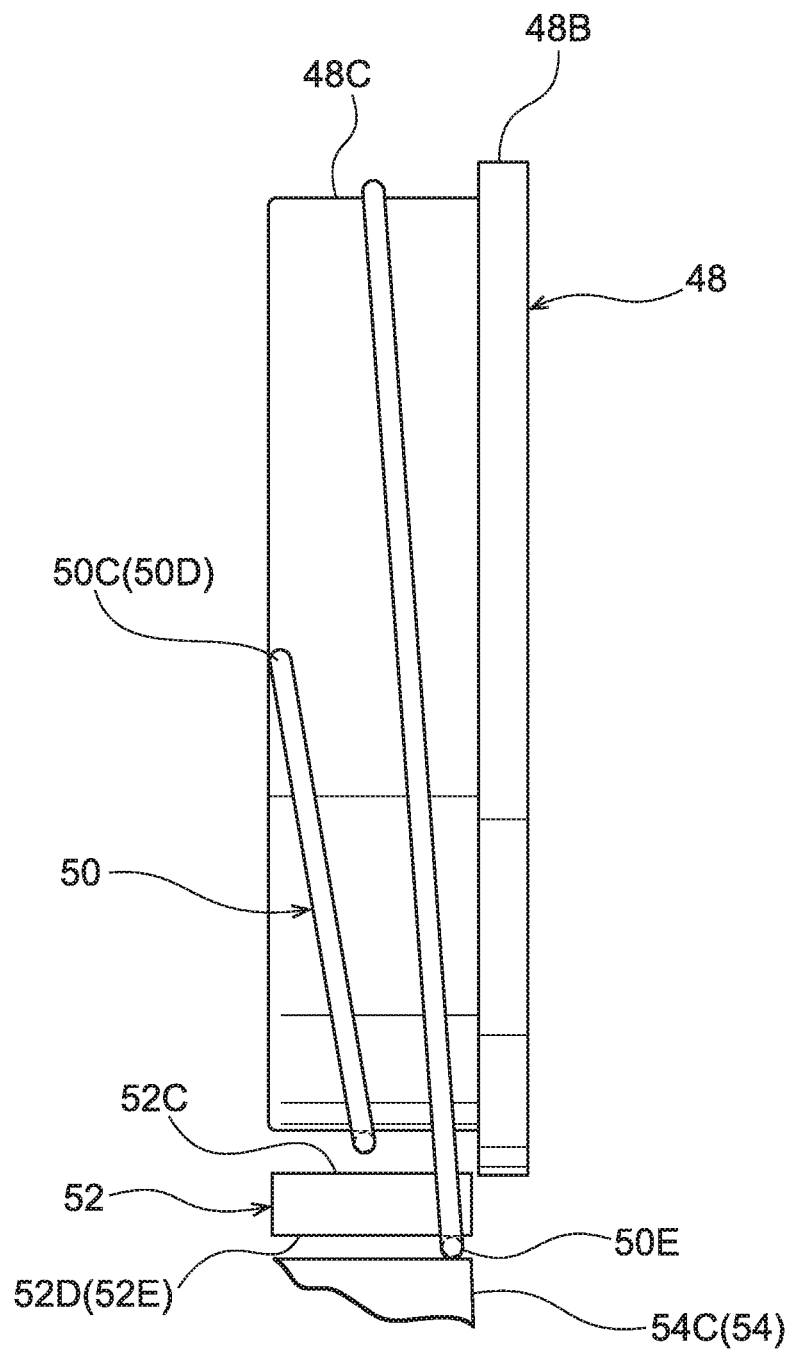
FIG. 9 is a side view schematically illustrating a state in which a winder section is taking up an energy absorbing wire.

Moreover, as illustrated in FIG. 8, in the present exemplary embodiment, the location 50D where the energy absorbing wire 50 is anchored to the winder section 48, and the location 50E where the energy absorbing wire 50 is pinched between the wire guide 52 and the lever 54, are disposed offset in the axial direction of the winder section 48. Accordingly, when the winder section 48 rotates together with the spool 14, as illustrated in FIG. 9, the energy absorbing wire 50 pulled through between the wire guide 52 and the lever 54 is taken up on the winder section 48 in a spiral shape with a clearance between the energy absorbing wire 50 and the flange 48B. This thereby enables the energy absorbing wire 50 to be taken up without radial direction overlap, even in a region where the winder section 48 and the spool 14 have rotated by more than one full revolution.

Figure 10:
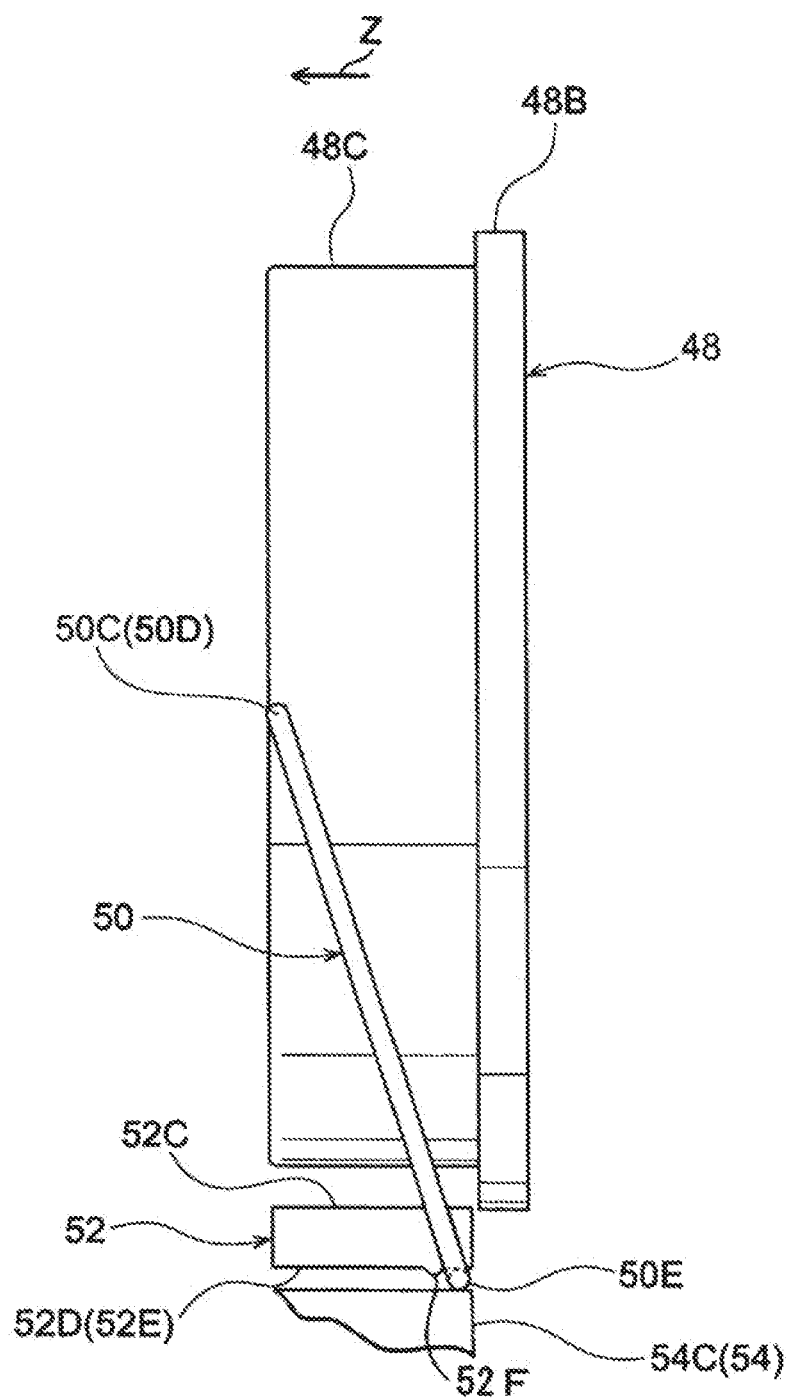

Moreover, in the present exemplary embodiment, when tension arises between the location 50D where the energy absorbing wire 50 is anchored to the winder section 48 and the location 50E where the energy absorbing wire 50 is pinched between the wire guide 52 and the lever 54, a portion of the wire guide 52 abutted by the energy absorbing wire 50 is deformed into a concave shape corresponding to the shape of the energy absorbing wire 50. Namely, the energy absorbing wire 50 adopts a state that fits into the portion of the wire guide 52 deformed into a concave shape. This thereby enables the position in the axial direction of the winder section 48 of the location where the energy absorbing wire 50 is pinched between the wire guide 52 and the lever 54 to be maintained. Note that as illustrated in FIG. 10, providing a restriction projection 52F to the wire guide 52 as a restriction portion to maintain the position in the axial direction of the winder section 48 of the location where the energy absorbing wire 50 is pinched between the wire guide 52 and the lever 54 enables configuration to be made such that the position of the location where the energy absorbing wire 50 is pinched between the wire guide 52 and the lever 54 is maintained in the axial direction of the winder section 48. Moreover, in cases in which the restriction projection 52F is provided, a portion of the wire guide 52 abutted by the energy absorbing wire 50 may also be configured so as to deform in a concave shape corresponding to the shape of the energy absorbing wire 50. Moreover, a restriction projection serving as a restriction portion corresponding to the restriction projection 52F may also be provided on the lever 54 side.

Moreover, as illustrated in FIG. 4, in the present exemplary embodiment, the another axial direction side end portion 50C of the energy absorbing wire 50 is displaced toward the another axial direction side of the ring shaped portion 50A through the radial direction inside of the ring shaped portion 50A, and the another axial direction side end portion 50C of the energy absorbing wire 50 is anchored to the one axial direction side end portion of the winder section 48. Accordingly, due to abutting the ring shaped portion 50A of the energy absorbing wire 50, the location 50E where the energy absorbing wire 50 is pinched between the wire guide 52 and the lever 54 is prevented from moving toward the one axial direction side. This thereby enables movement of the location 50E where the energy absorbing wire 50 is pinched between the wire guide 52 and the lever 54 to be suppressed from moving toward the one axial direction side.

Moreover, in the present exemplary embodiment, the energy absorbing wire 50, the preset face 44G of the housing 44, the winder section 48, and the like configuring the second force limiter mechanism 22 are arranged along the radial direction, thereby enabling the mechanism that generates the force limiter load to be suppressed from increasing in size along the axial direction. As a result, the webbing take-up device 10 can be suppressed from increasing in size along the axial direction. Furthermore, in the present exemplary embodiment, the inclusion of the second force limiter mechanism 22 enables the force limiter load generated by the torsion shaft 18 provided at the axial center portion of the spool 14 to be set smaller. This thereby enables a reduction in size (a smaller diameter and a shorter axis) of the torsion shaft 18.

Moreover, in the present exemplary embodiment, the respective configuration components configuring the second force limiter mechanism 22, such as the energy absorbing wire 50, the housing 44, and the winder section 48, are disposed at the radial direction outside of the rotation-limiting mechanism 24. This thereby enables the webbing take-up device 10 to be suppressed from increasing in size along the axial direction in comparison to cases in which the respective configuration components configuring the second force limiter mechanism 22 are disposed offset in the axial direction with respect to the rotation-limiting mechanism 24.

Moreover, in the present exemplary embodiment, the radial direction outside face of the ring shaped portion 50A of the energy absorbing wire 50 abuts the radial direction inside face of the preset face 44G, thereby attaching the energy absorbing wire 50 to the housing 44. This configuration renders a wall to separate the ring shaped portion 50A of the energy absorbing wire 50 from the winder section 48 unnecessary. This thereby enables an increase in size of the webbing take-up device 10 in the axial direction to be further suppressed.

Figure 11:
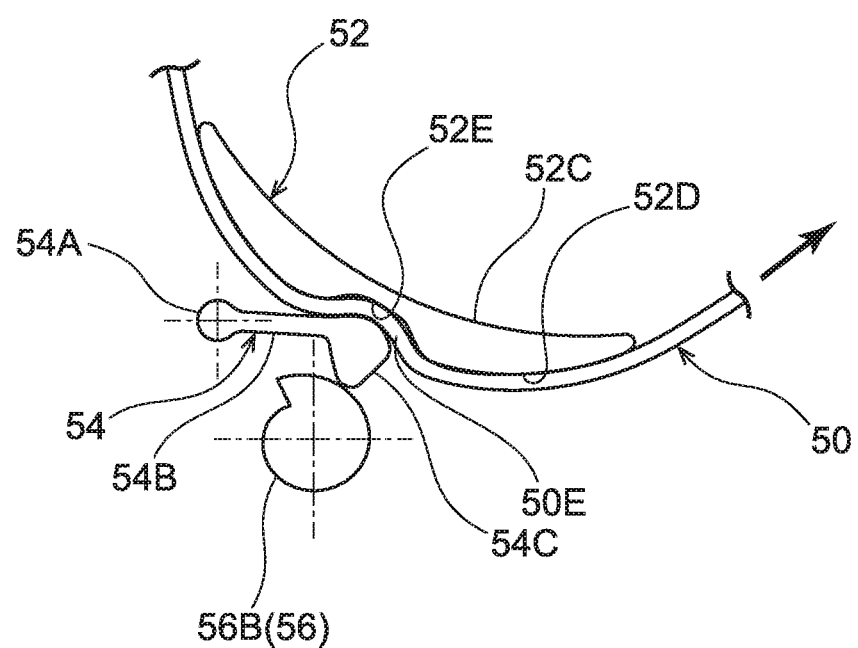
FIG. 11 is an enlarged face-on view corresponding to FIG. 6 and FIG. 7, illustrating a cam, a lever, and the like according to a modified example.

Note that in the present exemplary embodiment, explanation has been given regarding an example in which the cam body 56B of the cam 56 is provided with the large diameter portion 56C and the small diameter portion 56D in order to adjust the deformation amount of the energy absorbing wire 50. However, the present invention is not limited thereto. For example, as illustrated in FIG. 11, the radius of curvature of an outer peripheral face of the cam body 56B may be set so as to gradually increase on progression along the circumferential direction of the cam body 56B. Such a configuration enables the deformation amount of the energy absorbing wire 50 to be increased in a step-free manner as the remaining take-up amount of the webbing on the spool 14 decreases. Moreover, the deformation amount of the energy absorbing wire 50 may be increased in multiple steps configured by more than three steps by providing the outer peripheral face of the cam body 56 with locations having radii of curvature between those of the large diameter portion 56C and the small diameter portion 56D.

Moreover, in the present exemplary embodiment, explanation has been given regarding an example in which the deformation amount of the energy absorbing wire 50 is adjusted by moving the moving portion 54C of the cam 56 toward the wire guide 52 side. However, the present invention is not limited thereto. For example, the deformation amount of the energy absorbing wire 50 may be adjusted by moving the wire guide 52 toward the cam 56 side, or the deformation amount of the energy absorbing wire 50 may be adjusted by moving both the wire guide 52 and cam 56.

Moreover, in the present exemplary embodiment, explanation has been given regarding an example in which the webbing take-up device 10 includes the first force limiter mechanism 16 and the second force limiter mechanism 22. However, the present invention is not limited thereto. For example, a webbing take-up device may be provided only with a force limiter mechanism similar to the second force limiter mechanism 22.

Explanation has been given regarding an exemplary embodiment of the present invention. However, the present invention is not limited to the above, and obviously various other modifications may be implemented within a range not departing from the spirit of the present invention.

The disclosure of Japanese Patent Application No. 2015-089186, filed on Apr. 24, 2015, is incorporated in its entirety by reference herein.

The invention claimed is:

1. A webbing take-up device comprising:
   a spool that takes up a webbing worn by an occupant, and that is rotated in a pull-out direction due to the webbing being pulled out;
   a lock section that limits pull-out direction rotation of the spool in a vehicle emergency;
   an energy absorption member that, in a pressed state, permits pull-out direction rotation of the spool at or above a force limiter load when the lock section has limited pull-out direction rotation of the spool, and that is configured such that increasing a pressing force increases the force limiter load at least from an initial state of pull-out of the webbing from the spool; and
   a force limiter load adjustment mechanism that adjusts the pressing force of the energy absorption member according to a remaining take-up amount of the webbing on the spool.

2. The webbing take-up device of claim 1, wherein:
   the force limiter load adjustment mechanism includes a first pressing section and a second pressing section, the energy absorption member being interposed between the first pressing section and the second pressing section; and
   at least one of the first pressing section or the second pressing section is displaced to a position corresponding to the remaining take-up amount of the webbing on the spool, and the pressing force of the energy absorption member is adjusted due to relative movement of the first pressing section and the second pressing section towards or away from each other due to the displacement.

3. The webbing take-up device of claim 2, wherein:
   the force limiter load adjustment mechanism includes a displacement member that is displaced by rotation transmitted from the spool; and
   at least one of the first pressing section or the second pressing section is displaced due to the displacement member being displaced.

4. The webbing take-up device of claim 1, wherein the force limiter load adjustment mechanism determines the pressing force of the energy absorption member according to an amount of webbing initially pulled out from the spool at a time when the occupant wears the webbing.

5. A webbing take-up device comprising:
   a spool that takes up a webbing worn by an occupant, and that is rotated in a pull-out direction due to the webbing being pulled out;
   a lock section that limits pull-out direction rotation of the spool in a vehicle emergency;
   an energy absorption member that, in a pressed state, permits pull-out direction rotation of the spool at or above a force limiter load when the lock section has limited pull-out direction rotation of the spool, and that is configured such that increasing a pressing force increases the force limiter load; and
   a force limiter load adjustment mechanism including a pressing section that presses against the energy absorption member, the force limiter load adjustment mechanism adjusting the pressing force of the energy absorption member by displacing the pressing section according to a remaining take-up amount of the webbing on the spool.

* * * * *